United States Patent [19]

Carreras et al.

[11] Patent Number: 4,667,090

[45] Date of Patent: May 19, 1987

[54] SYNTHETIC APERTURE MULTI-TELESCOPE TRACKER APPARATUS

[75] Inventors: Richard A. Carreras, Albuquerque, N. Mex.; Salvatore J. Cusumano, Champaign, Ill.; Morton B. Jenks, Corrales; Robert I. Suizu, Albuquerque, both of N. Mex.

[73] Assignee: The United States of America as represented by the Secretary of the Air Force, Washington, D.C.

[21] Appl. No.: 743,338

[22] Filed: Jun. 10, 1985

[51] Int. Cl.⁴ .................. G01T 1/20; G01B 11/26
[52] U.S. Cl. .................... 250/201; 250/203; 356/141
[58] Field of Search .............. 250/201 R, 203 R; 356/141, 152

[56] References Cited

U.S. PATENT DOCUMENTS

| | | | |
|---|---|---|---|
| 3,578,975 | 5/1971 | Wheeler | 250/203 |
| 3,591,292 | 7/1971 | Feuchter et al. | 356/141 |
| 3,723,745 | 3/1973 | Fletcher et al. | 356/152 |
| 3,992,629 | 11/1976 | Chapman | 250/338 |
| 4,219,811 | 8/1980 | Herman et al. | 343/5 CM |
| 4,356,392 | 10/1982 | Wittekock et al. | 250/201 |
| 4,384,198 | 5/1983 | Williamson | 250/203 R |
| 4,413,909 | 11/1983 | Pohle | 356/354 |
| 4,419,012 | 12/1982 | Stephenson et al. | 250/203 R |

Primary Examiner—David C. Nelms
Assistant Examiner—William L. Oen
Attorney, Agent, or Firm—William Stepanishen; Donald J. Singer

[57] ABSTRACT

A plurality of telescopes provide output return signals which are applied both directly and in sampled form to a photo-detector cell. The detected signals from the photo-detector will represent the constant and transient errors of the telescope system. A low pass filter insures that the tracker provides only the constant or D.C. component of the error, while a high pass filter insures that the existing measuring devices for each telescope beam provide only the transient or A.C. component of the error. The A.C. and D.C. error signals are summed together with the appropriate applied gains on each channel such that the sum reconstructs the original telescope position error with good fidelity.

6 Claims, 11 Drawing Figures

SYNTHETIC APERTURE MULTI-TELESCOPE TRACKER APPARATUS

STATEMENT OF GOVERNMENT INTEREST

The invention described herein may be manufactured and used by or for the Government for governmental purposes without the payment of any royalty thereon.

BACKGROUND OF THE INVENTION

The present invention relates broadly to a tracker apparatus, and in particular to a synthetic aperture multi-telescope tracker apparatus.

In the prior art, the use of multiple telescopes in a synthetic array has encountered a number of operational problems. One of these problems has been experimentally observed to involve low frequency drift in the optical far field pattern of the multiple telescopes. In order to keep the telescopes properly phased with respect to each other, it was required that manual compensation be provided. Furthermore, this manual compensation had to be performed on a continuous basis, since the various environmental disturbances that are encountered, will change the characteristics of the optical elements in the telescope system The telescope tracker apparatus provides an automated method by which this compensation can be performed. Another prior art problem that is encountered is the synchronization of the multiple telescopes in order that they operate in a manner similar to or resembling a single telescope. In addition, there arises numerous problems with respect to the correlation and processing of the telescope data. The use of multiple telescope arrays is further compounded by the utilization of telescope control and alignment systems which involve mechanical components such as high bandwidth piston loops. The Air Force Weapons Laboratory is currently conducting an in-house experiment to study the feasibility and complexities of phasing multple telescope arrays. In order to achieve true phasing between telescopes, the output from each telescope must be coherently summed at the same spot or reference point in the optical far field. The tilt and piston induced errors are the dominant barriers to effective phasing and must be corrected. In addition, the operation of control loops without some tracking of the low frequency errors tend to exhibit pronounced drift and the periodic loss of phasing over extended periods of time. The present invention is a multi-telescope tracker apparatus that utilizes a single set of electronics and a single photo-detection unit to simultaneously measure and compensate for errors in the operation of a multiple set of telescopes. A complementary filter pair within the tracker electronics allows the low frequency tracking error signals to be incorporated into the existing control loops with no significant loss of bandwidth and with improved temporal stability.

SUMMARY OF THE INVENTION

The present invention utilizes optical and electrical tracking system components to achieve simultaneous, low-bandwidth tracking of the tilt-induced errors on the signal beams from three independent telescopes. Each signal beam is passed through the same rotating chopper wheel which includes strategically placed sampling apertures or holes to allow the sequential sampling of the return beams. The sampled beams are then focused onto a single photo-detector cell wherein the beams are multiplexed, thus allowing a single detector to sample all the return beams while providing a single common reference point. The sampled beam is combined with the direct return beam signal from each telescope to provide an error tilt compensation signal.

It is one object of the present invention, therefore, to provide an improved synthetic aperture multi-telescope tracker apparatus.

It is another object of the invention to provide an improved synthetic aperture multi-telescope tracker apparatus that utilizes an array of multiple telescopes to achieve a synthetic aperture.

It is another object of the invention to provide an improved synthetic aperture multi-telescope tracker apparatus that utilizes the optical phasing of an array of telescopes to achieve the same performance of a single telescope of substantially greater optical length.

It is another object of the invention to provide an improved synthetic aperture multi-telescope tracker apparatus wherein the physical dimensions of the individual telescopes in the array are substantially smaller than a single telescope of equal power.

It is another object of the invention to provide an improved synthetic aperture multi-telescope tracker apparatus wherein the temporal stability of the control mechanisms that keep the multiple telescopes phased with respect to each other, is increased.

These and other advantages, objects and features of the invention will become more apparent after considering the following description taken in conjunction with the illustrative embodiment in the accompanying drawings.

DESCRIPTION OF THE PREFERRED EMBODIMENT

Figure 1:
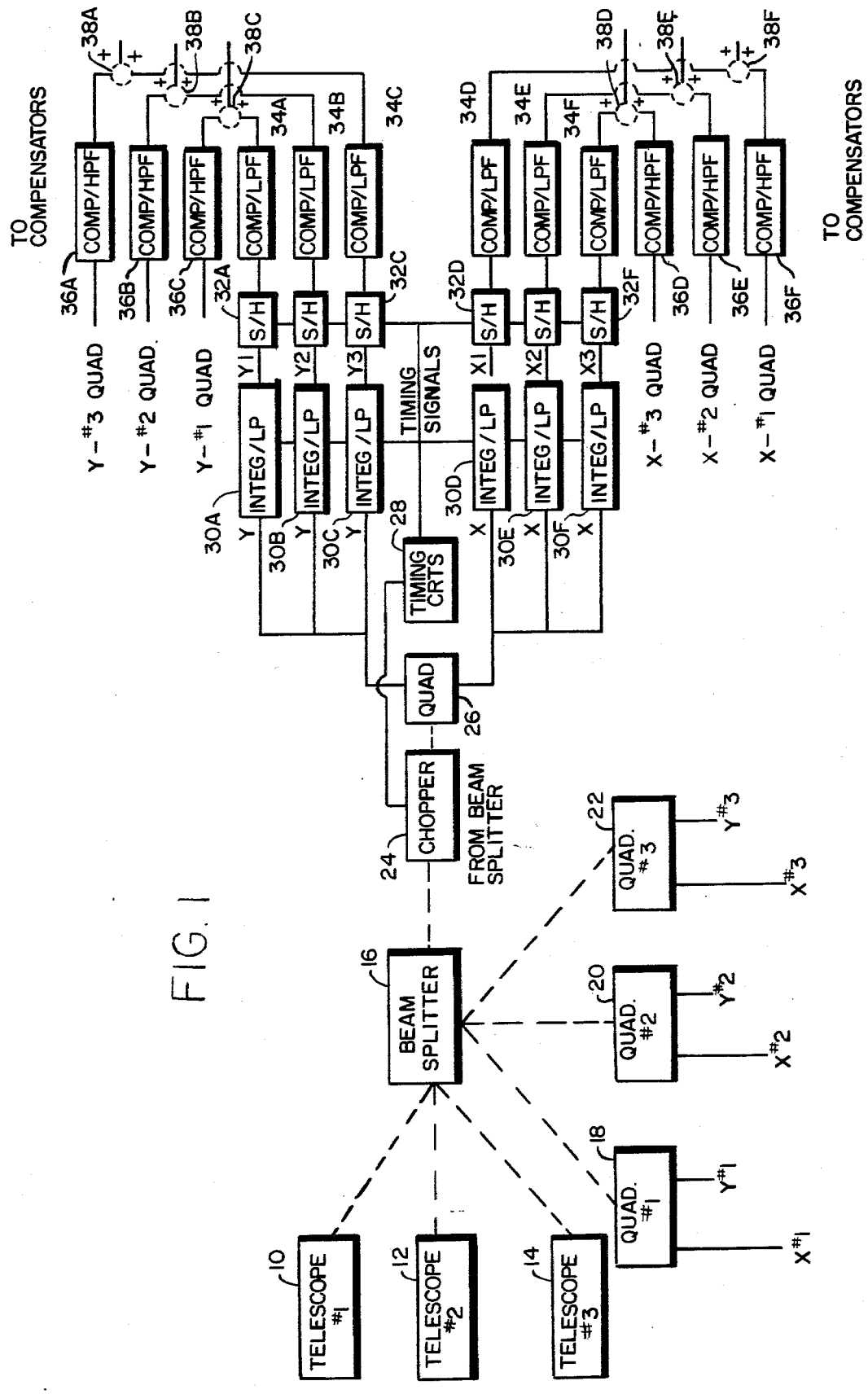
FIG. 1 is a block diagram of the synthetic aperture multi-telescope tracker apparatus according to the present invention.

Referring now to FIG. 1, there is shown a synthetic aperture multi-telescope tracker apparatus wherein a plurality of telescopes 10, 12, 14 provide output signals to the beam splitter unit 16. The beam splitter unit 16 is arranged such that the output signal from the #1 telescope unit 10 is applied to the #1 dynamic quad sensor unit unit 18, the #2 telescope unit 12 to the #2 quad sensor unit unit 20, and the #3 telescope unit 14 to the #3 quad sensor unit 22. The quad sensor units 18, 20, 22 respectively convert the received optical signals into electrical signals which represent the telescope return signal offset in terms of x and y of the displacement from the quad unit center. The output signals from the telescopes 10, 12, 14 pass through the beam splitter unit 16 to the chopper unit 24. The chopper unit 24 generates timing signals which are applied to the timing circuits unit 28. The chopper unit 24 utilizes a chopper wheel to provide sampled telescope output return signals to the quad unit 26. The output of the quad unit 26 comprises x and y signals for each of the three sampled telescope output returns. These x and y component signals are respectively applied to integrated/low pass filter units 30a–30f. Each output from the integrator/low pass filter units 30a–30f is appropriately designated Y1, Y2, Y3 to indicate the telescope of origin for the particular y signal. The same designation has been utilized with respect to the x signal wherein the outputs are respectively labelled X1, X2, and X3.

A plurality of sample and hold units 32a–32f are respectively connected to the plurality of integrator/low pass filter units 30a–30f to receive the x and y signals therefrom. Timing signals from the timing circuits unit 28 are applied to each unit of the plurality of integrator/low pass filter units 30a–30f and, the sample and hold units 32a–32f. A plurality of complementary low pass filters 34a–34f are respectively connected to the sample and hold units 32a–32f. In addition, a plurality of complementary high pass filters 36a–36f are respectively connected to receive the indicated input signal from the three quad units 18, 20, 22. It should be noted that the quad units 18, 20, 22 and 26 may each comprise a single photodetector cell that is divided by a suitable mask into four quad detector units. The quad sensor units of the present invention are well known and are commercially available. For example, one such suitable device is the UDT model 431 x-y position indicator from United Detector Technology of Culver City, Calif. The output signal from the complementary low pass filters and the complementary high pass filter are combined in summing units 38a–38f respectively to provide an x and y tilt error compensation signal for each telescope unit 10, 12, and 14. For example, the output signal from the complementary low pass filter unit 34a which represents the sampled y component from the #1 telescope unit 10 is combined with the output signal from the complementary high pass filter unit 36c to provide a total y error tilt compensation signal for the #1 telescope unit 10. With respect to the x component for the #1 telescope unit 10, the same procedure is followed using the appropriate circuit units as shown in FIG. 1. The above procedure is utilized for the x-y signal for each of the telescope units 10, 12, and 14.

The telescope tilt error tracker system as described in FIG. 1 is designed to be incorporated into currently existing telescope tracker systems. It may be noted that the present tracker circuit requires the utilization of an additional optical leg. This optical leg utilizes the telescope beam returns from all three telescopes to provide a common reference in the far field for all three telescopes. The samples of each telescope return are processed to obtain the constant or DC component of the tilt error separately in x and y.

While the telescope beam returns are being sampled by the tracker, each return is being measured with its own quad cell which is henceforth referred to as the dynamic quad. This means that two independent measurements are taken of the tilt errors of each telescope return. The d.c. component of the tilt error can be extracted by passing the sampled measurement from the tracker through a low pass filter. The high frequency components of the tilt error are still preserved in the measurement process from the individual quad cells.

The telescope tilt error signals are separated into the low (D.C.) and high (A.C.) error signals in x and y and the measurement which is provided by the quad cell is sent to the system compensator so the tilt errors may be taken out of the system. What has been described so far results in a measurement of the d.c. component of the tilt error and a measurement which has all frequency components of that same error. In order to operate the control loops properly, the compensator must see the same error signal that it receives via the dynamic quad measurement. At the same time, in order to operate the tracker, its measurement needs to be embodied in the signal sent to the compensator.

The obvious solution is to sum both measurements before sending the error information to the compensator. However, a straight summation would unevenly weight the low frequency components of the error because the sampled measurement has been filtered to attenuate the high frequency error components. The solution to this problem is the establishment of a network of complementary filters. These filters are designed to selectively pass a portion of the frequency spectrum but are matched so that the transfer function of their sum is unity at all frequencies. In the present apparatus, the complementary filter network is comprised only of a high and low pass filter unit and a summer unit. As mentioned above, the low pass filter is used to isolate the d.c. component of the tilt error, and the high pass filter is matched to that low pass filter. FIG. 1 provides a functional block diagram which illustrates the generation of the tracker measurements and the manner in which they are combined with the measurements of the dynamic quad. Once the two error measurements have been combined, the sum tilt error signal is sent to the system tilt loop compensators to be utilized in the same manner as prior telescope tracker compensation systems.

Functionally, the tracker electronics can be divided into two sections: timing and sampling. Since a single quad cell is used to measure the telescope beam returns of all three telescopes, the timing is the most critical portion of the tracker. Correspondingly the timing of the tracker and hence its sampling process is highly dependent on the operation of the chopper and the configuration of the chopper wheel, thus, the chopper wheel will be discussed first.

Figure 2A:
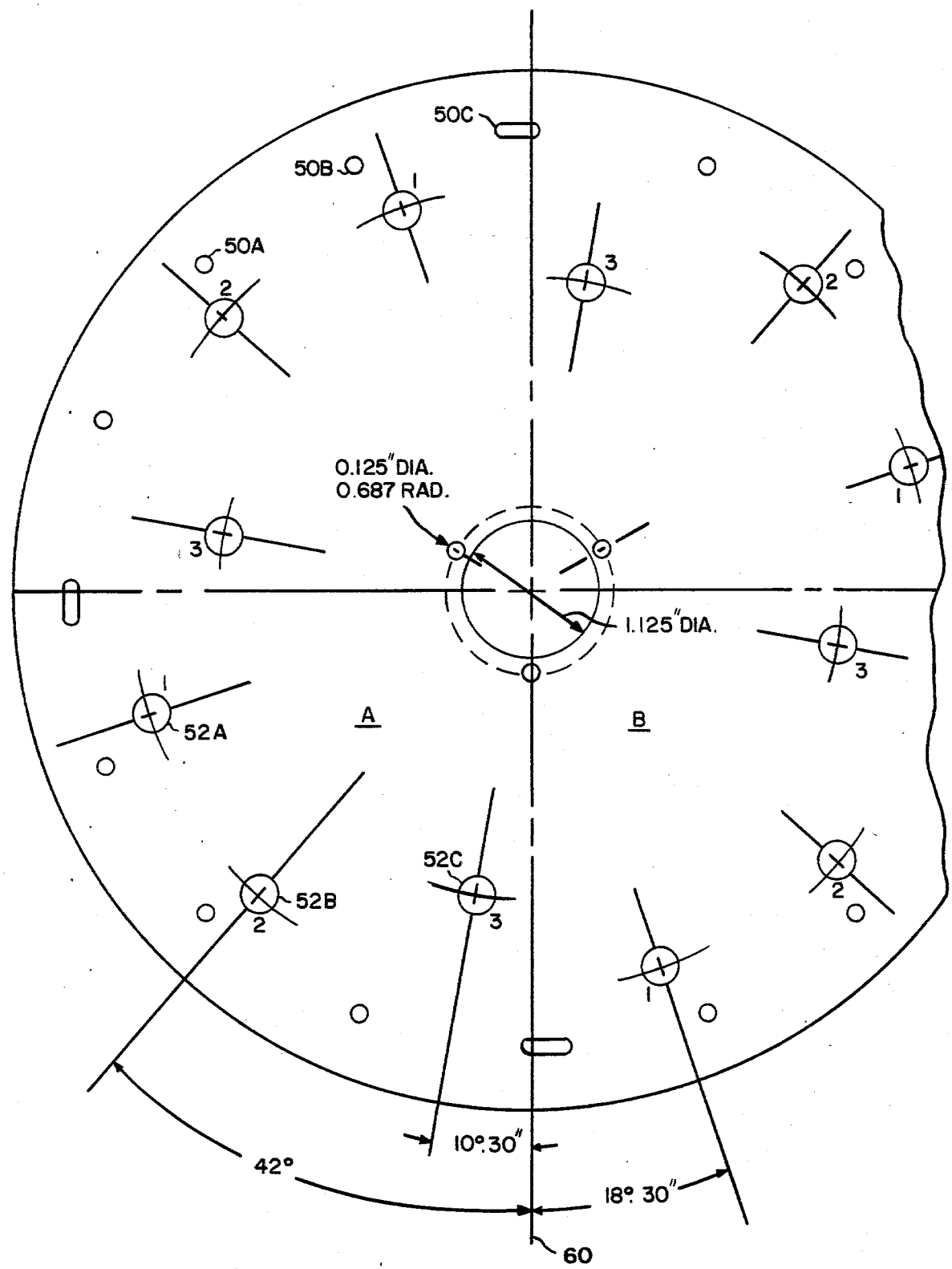
FIGS. 2a, 2b are the front and side views respectively of the chopper wheel which is utilized in the tracker apparatus, FIGS. 3a, 3b in combination are graphical representations of the timing and data signals within the tracker apparatus, FIG. 4 being comprised of FIGS. 4a–4d which in combination as shown, are a schematic diagram of the synthetic aperture multi-telescope tracker apparatus, and, FIG. 5 is a schematic diagram of the complementary high pass and low pass filter units.

Turning now to FIG. 2a there is shown a partial front view of the chopper wheel that is utilized in the present invention. This view of the chopper wheel illustrates the placement of the timing and sampling holes. The outermost row of holes and slots (representative examples of which are designated 50a, 50b, 50c) is used to generate the timing signals.

A plurality of sampling holes are arranged in each quadrant of the chopper wheel. For example, quadrant A contains three sampling holes 52a, 52b, 52c which respectively sample the output signals from the three telescopes. The sampling hole pattern of quadrant is repeated for the remaining three quadrants of the chopper, wheel. Sampling hole #1 in quadrant B is positioned at 18°30″ in a counter clockwise direction with respect to reference line 60. Sampling hole #2 in quadrant A is positioned at 40° in a clockwise direction with respect to reference line 60. All the sampling holes #1, #2, #3, comprise 0.300 inch diameter holes in the chopper wheel. The radius line from the center of the chopper wheel to the center of the respective sampling holes is as follows:

| Sampling Hole | Radius (Inches) |
|---|---|
| #1 | 3.445 |

-continued

| Sampling Hole | Radius (Inches) |
|---|---|
| #2 | 3.375 |
| #3 | 2.265 |

Figure 2B:
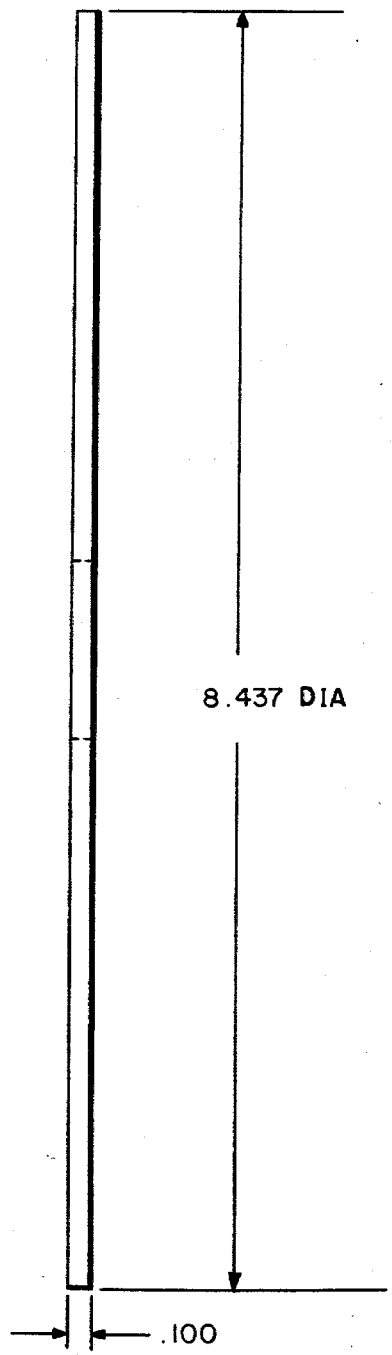

The timing holes comprise 0.125 inch diameter holes on a radius of 3.75 inches, while the slots are 0.125×0.375 inches and are spaced 90° apart. As shown in FIG. 2a, there is a combination of 16 holes and slots which are spaced 22°30" from each other. In FIG. 2b, there is shown a side view of the chopper wheel wherein the overall diameter is 8.437 inches and the thickness is 0.100 inch.

Figure 3A:
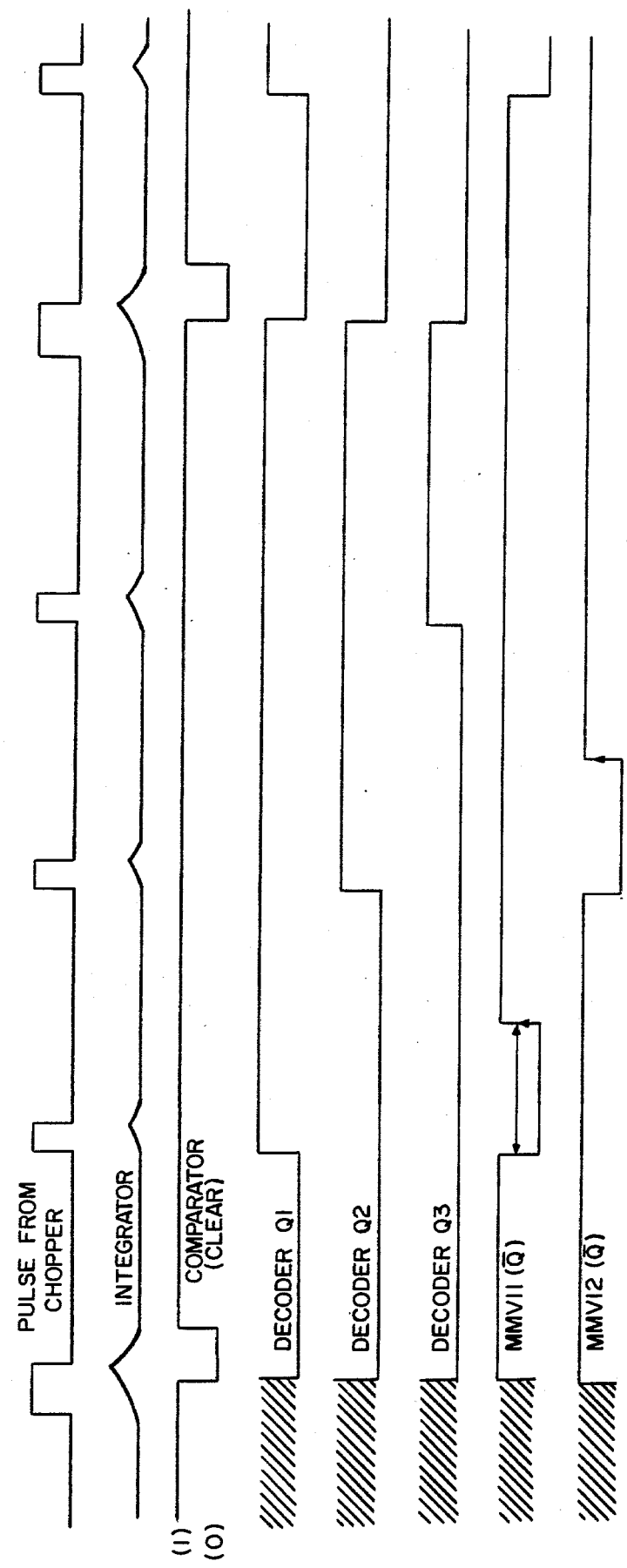
Figure 3B:
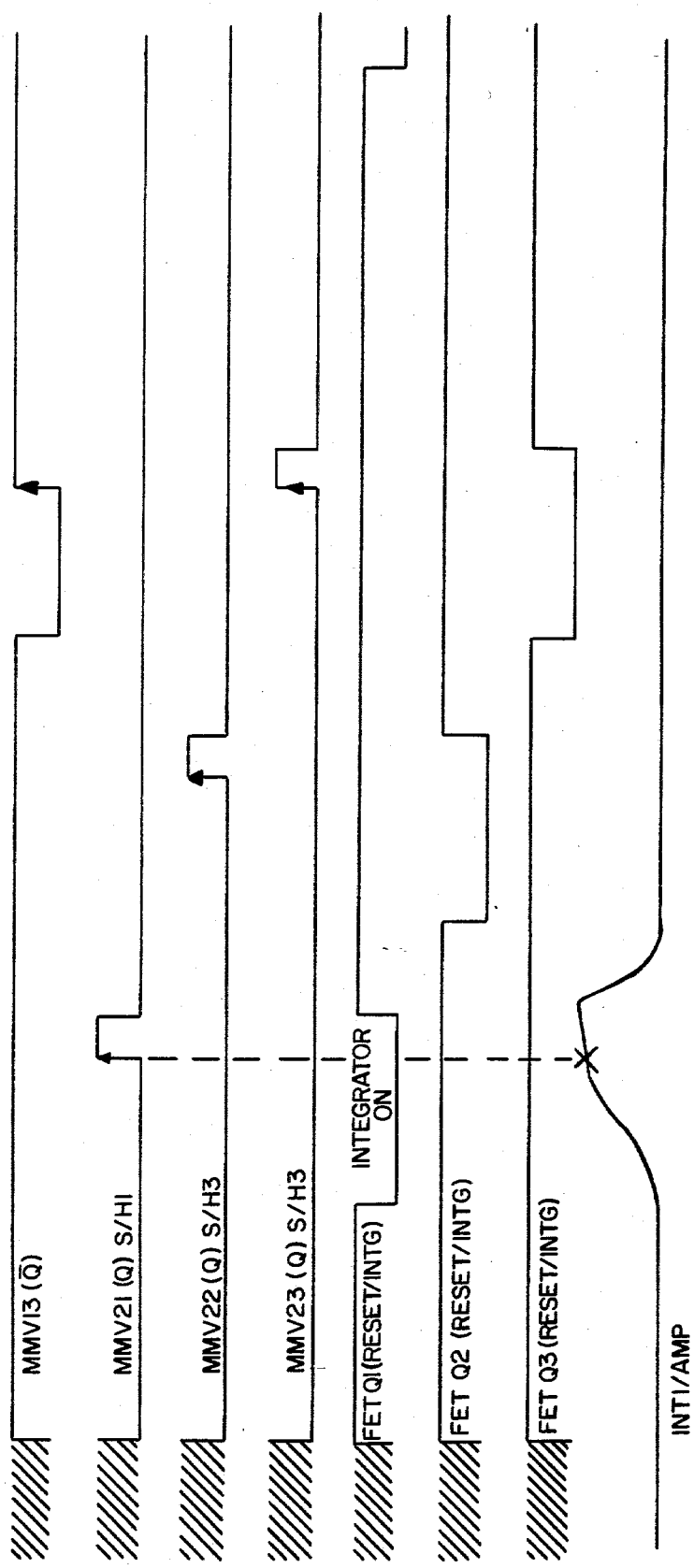
Figure 4:
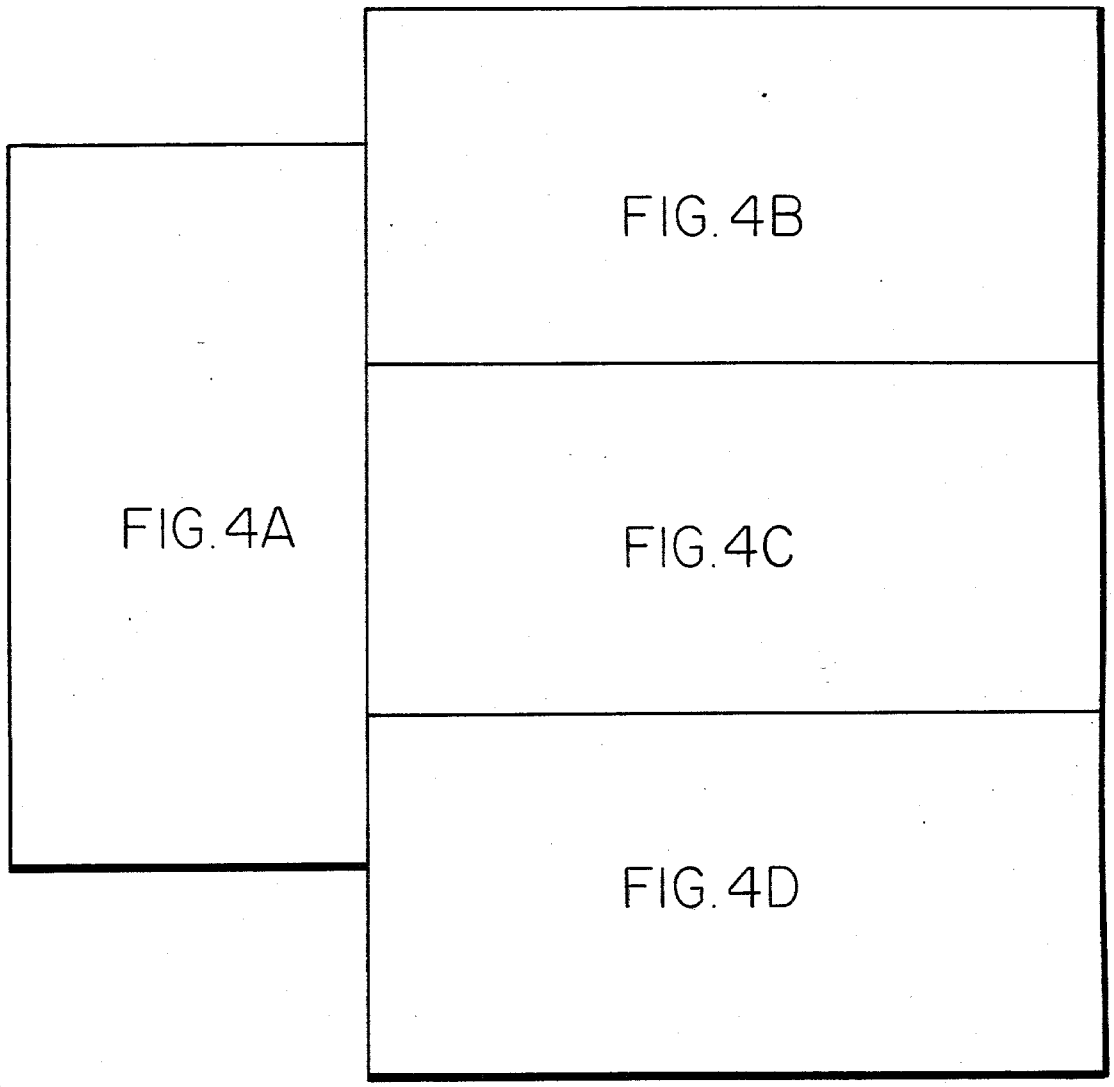
Figure 4A:
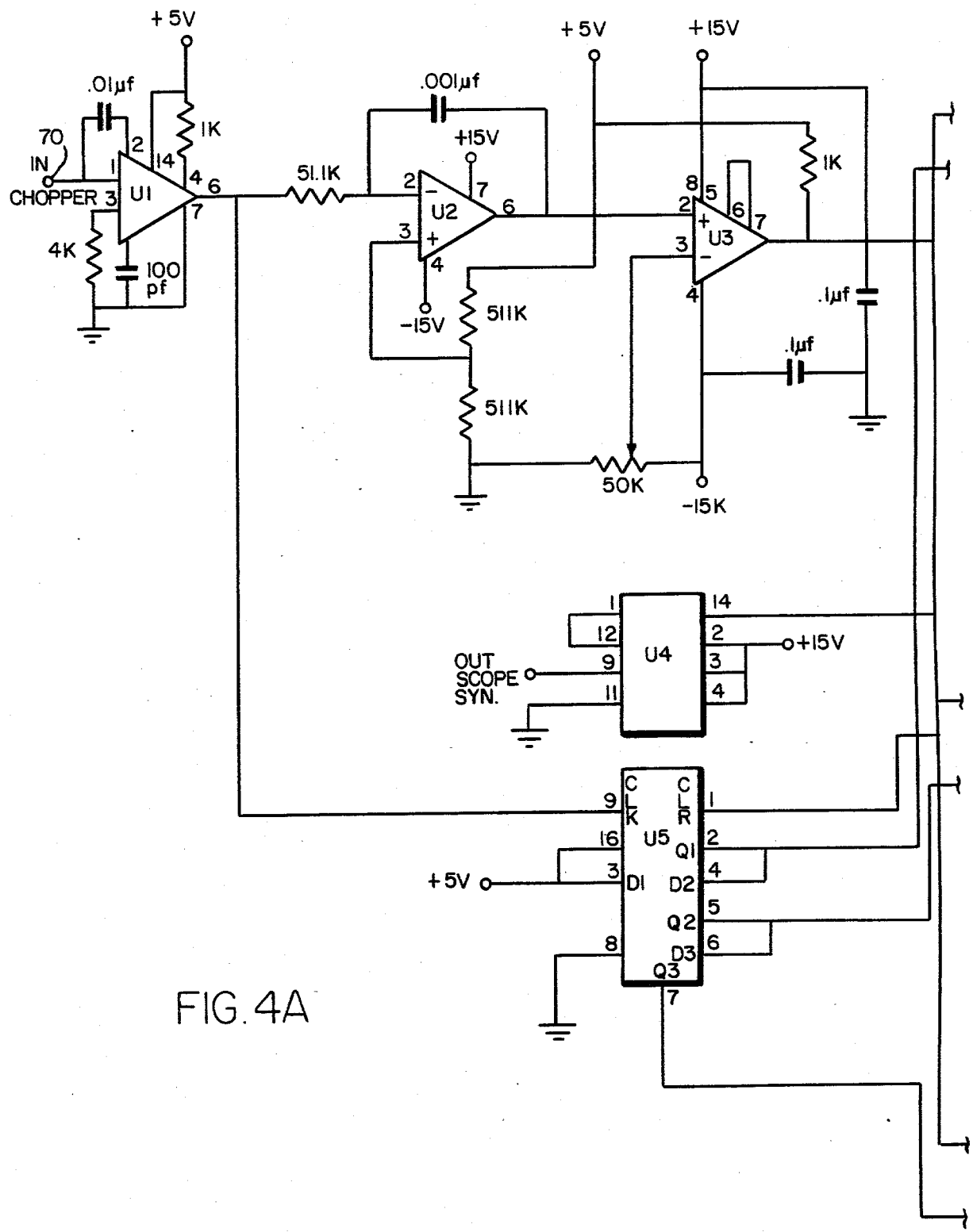
Figure 4B:
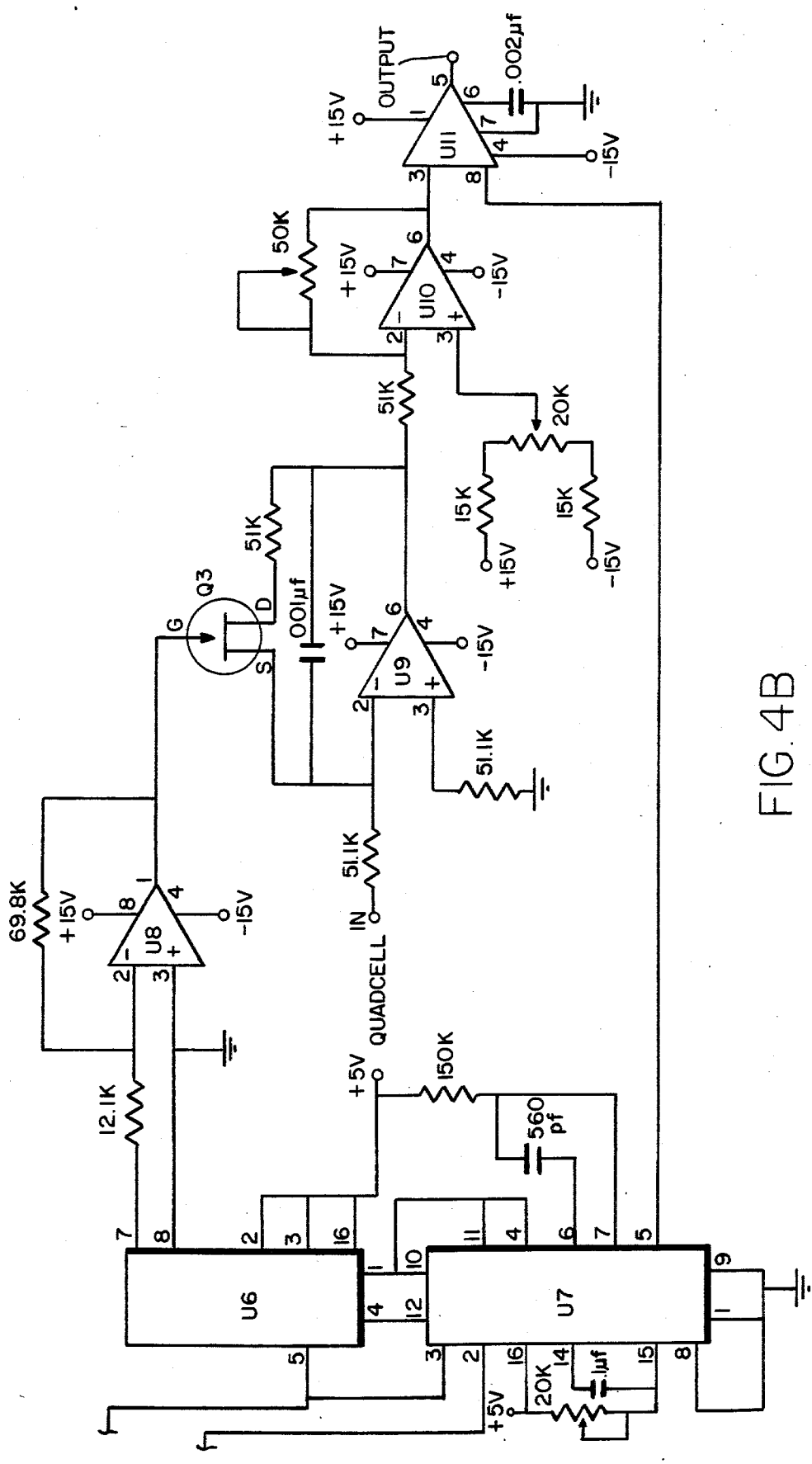
Figure 4C:
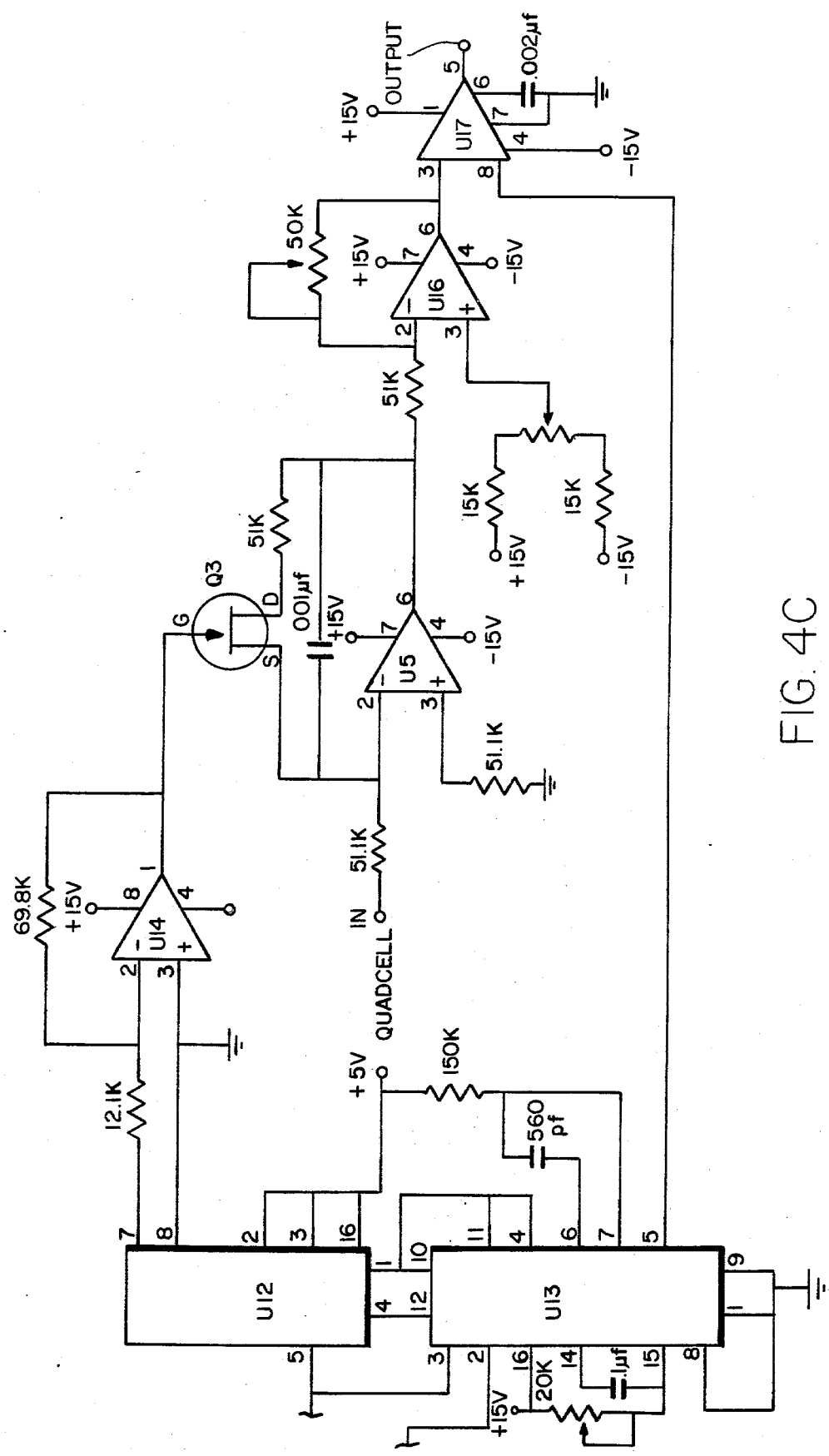
Figure 4D:
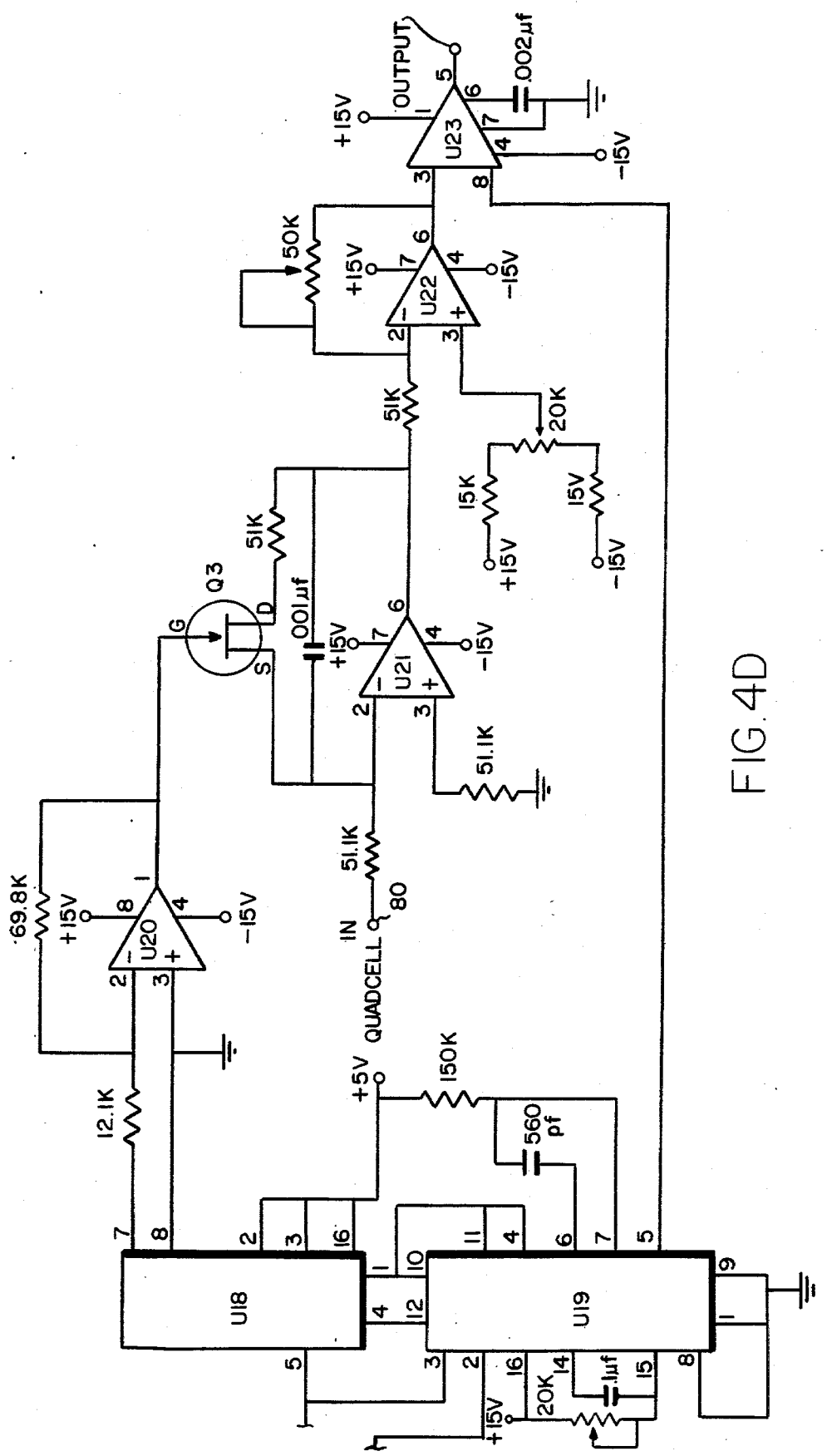

The sampling holes are strategically arranged apertures which allow the telescope output returns to pass through the chopper wheel at a unique point for each telescope. The chopper unit which was described in FIG. 1 includes a photodetector/emitter device which senses light through the timing holes and generates the appropriate timing pulses. The timing pulses are utilized in the electronic tracking circuit to process the telescope return signals into tilt error compensation signals. There is shown in FIGS. 3a and 3b the timing diagram for the tracker chopper wheel which was described above. The timing pulses from the chopper wheel comprise one long pulse followed by three evenly spaced shorter pulses. The long pulse is used as a sync pulse while the other pulses are utilized to trigger the sampling of the quad cell measurement. The duration and frequency of these pulses is dependent on the speed at which the chopper wheel is rotated. The timing pulses from the chopper wheel are used to drive the tracker electronic circuits. Reference will be made to the waveforms in FIGS. 3a, 3b with respect to the description of the tracker circuits that is shown in FIGS. 4a–4d respectively. The schematic for the tracker electronics circuits comprises FIG. 4a–4d which are arranged as indicated in FIG. 4. The tracker schmatic of FIGS. 4a–4d represents a schematic diagram of the timing circuits unit 28, the integrator/low pass filter units 30a–30c and the sample and hold units 32a–32c of FIG. 1. With respect to the timing circuits, the integrated circuit units U1–U6, U12 and U18 comprise the timing circuitry. The remaining components U7–U11, U13–U17 and U19–U23 comprise the remainder of the circuit diagram which is associated with the sample, hold and summing function. The integrator units U1–U19 and transistors Q1–Q3 are implemented as shown in Table 1 below.

TABLE 1

| U1 | DS8820 |
|---|---|
| U2 | HA2525 |
| U3 | LM311 |
| U4 | 74LS93 |
| U5 | 74LS174 |
| U6 | 74LS109 |
| U7 | 74LS123 |
| U8 | LM358 |
| U9 | HD2525 |
| U10 | HD2525 |
| U11 | LF398 |
| U12 | 74LS109 |
| U13 | 74LS123 |
| U14 | LM358 |
| U15 | HD2525 |
| U16 | HD2525 |
| U17 | LF398 |
| U18 | 74LS109 |
| U19 | 74LS123 |
| U20 | LM358 |

TABLE 1-continued

| U21 | HD2525 |
|---|---|
| U22 | HD2525 |
| U23 | LF398 |
| Q1,2,3 | TIS73 |

The electronic circuit which is shown in FIGS. 4a–4d represents only the three y-axis error circuit components (one for each of the three telescopes) for the telescope tracker apparatus. The three x-axis error circuits (not shown) are similar to the circuitry that is used for the three y-axis error circuit components.

The timing pulses which are generated in the chopper unit are applied to integrated circuit U1 which is a DS 8820 receiver unit at input terminal 70. This integrated circuit receiver unit U1 acts as a clean-up stage for the received timing pulses. The output from the integrated circuit U1 is applied to an integrated circuit integrator U2. The output of the integrator unit U2 is shown in the second line of the timing diagram in FIG. 3a. Since the sync pulse is generated by the slot in the chopper wheel, it has a longer duration, and as a result thereof, the output signal (Integrator waveform of FIG. 3a) of the integrator unit U2 will go up to a higher value than it will for the other pulses. The comparator unit U3 can be adjusted so that a pulse can be generated which corresponds only to the reception of another sync pulse. This is illustrated in the timing diagram of FIG. 3a by the line labeled "COMPARATOR (CLEAR)". This comparator pulse which is used to clear or reset other components in the tracker electronics circuit, will be discussed in detail in the following paragraphs.

One of the components which is cleared by the COMPARATOR (CLEAR) is the decoder unit U5. The decoder unit U5 is a 74LS174 hex D-type flip-flop chip, which for this application, is used in conjunction with the timing pulses to trigger the sampling of the telescope returns. Turning to FIG. 3a of the timing diagram there is shown the waveforms for the decoder output (DECODER Q1, DECODER Q2, DECODER Q3), it should be noted that the active low clear pulse from the comparator sets all three decoder outputs to a logic zero (0). When the first of the short timing pulses is received, it is used to clock the decoder chip unit U6 and the output of transistor Q1 goes to a logic 1 (high). This output in turn will be used to start the sampling of the telescope beam return signal that is associated with that timing pulse. When transistor Q1 is high, the next time the decoder is clocked, the transistor Q2 will go high. Similarly, when the transistor Q2 is high, the next clock pulse will set transistor Q3 high. The output lines of all three decoder units U6, U12, U18 will remain high until cleared to a logic 0 (low) by the COMPARATOR (CLEAR).

The remaining component in the timing section of the tracker schematic is integrated circuit unit U4 which is primarily an aid to checking out the tracker circuit. Integrated circuit unit U4 is 74LS93 4-bit binary counter. It has been configured to generate a trigger pulse for an oscilloscope at every fourth CLEAR pulse that is generated by the comparator. This enables the entire timing cycle to be observed on an oscilloscope during circuit operation for various purposes such as trouble shooting.

The discussion of the tracker apparatus will be directed to the components which are involved with sampling and holding the measurements of the telescope beam return signals. The following description will be directed at only one of the six measurement channels since all the channels are identical (three x-axis channels, three y-axis channels). It will be recalled from the timing circuit discussion that the decoder units outputs will be set high when the associated timing pulses for each telescope are received. Each of these decoder outputs which are labeled "Select" lines on the schematic go to a 74LS123 dual retriggerable monostable multivibrator chip which, for the channel under discussion, is integrated circuit unit U19 on the circuit diagram. When the dual retriggerable monostable multivibrator chip receives the a rising edge on the select line (going from a logic 0 to a logic 1), it will send out an active low pulse (line MMV13 (Q) in the timing diagram).

The duration of this pulse is dependent on the RC combination which is connected to pins 14 and 15 of integrated circuit unit U19. It should be noticed that the resistor value (20K) is variable to allow the manual adjustment of the pulse duration Since this pulse length will be used to determine the integration time during the sampling process, the integration time is also variable. This variable pulse is used to trigger the other one-shot on the chip. This time the pulse duration is fixed to approximately 27.7 usec (see line MMV23(Q) S/H3 in the timing diagram).

The variable pulse and the 27.7 usec pulse together determine the total integration time (see MMV13(Q), MMV23(Q), and field-effect transistor Q3 (Reset/Intg) in the timing diagram). The additional 27.7 usec is needed to provide sufficient time after the variable integration pulse for the sample and hold circuit. The device which OR's these pulses temporally is a J-K flip-flop unit U18. It should be noted that although the circuit uses the Q output of the flip-flop, the timing diagram shows the the timing for the Q output, so be aware of the reversal in logic when following the timing diagram. The following description will be consistent with the timing diagram. When the CLEAR pulse is generated by the comparator, it presets the output of the flip-flop high. The start of the variable pulse clears the flip-flop and sets the output low. It remains low until rising edge of the 27.7 usec pulse clocks the flip-flop and sets the output high once more.

As stated earlier, the output of the J-K flip-flop is the total integration time. This integration pulse is passed to an op-amp unit U20, which in turn drives a field-effect transistor field-effect transistor Q3. In this application, the field-effect transistor Q3 is merely a switch in an integrator/low pass filter circuit unit U21.

This integrator/low pass filter circuit unit U21 receives at its input terminal 80 the measurement signal which is generated in the quad cell. For the purpose of this discussion, the schematic diagram reflects only the y-axis error signal, although the three x-axis error processing circuitry is identical to the present schematic. In FIGS. 4a–4d, it is the y-axis error component, or of displacement of the telescope return from the center of the quad cell that will be described and discussed. Although all three telescope returns are falling on the same quad cell in the tracker design, the placement of the sampling apertures on the chopper wheel and the switching of the field-effect transistor Q3 will insure that only the desired telescope output return is being sampled at the appropriate time. When the field-effect transistor Q3 switch is ON, logic 0 in the timing diagram, the integrated circuit unit U21 behaves like an integrator. When the switch (field-effect transistor Q3) is OFF (logic 1 in the timing diagram), the integrated circuit unit U21 acts like a low pass filter.

The output of the integrator/low pass filter circuit unit U21 is then passed to an offset/gain adjustment unit U22. This gain adjustment capability provides some flexibility in the output range of the tracker signals and allows any biases in the circuit to be taken out.

Once the gain has been set at the desired level and the offsets have been removed, the signal is passed to the sample and hold unit U23. The 27.7 usec pulse from the integrated circuit unit U19 (74LS123) is used to trigger the sampling process. For the capacitor value chosen, acquisition time for this circuit is approximately 12 usec. The sampled value is held until the next sample is taken. The output of the sample and hold unit U23 is then applied to the complementary filters.

Figure 5:
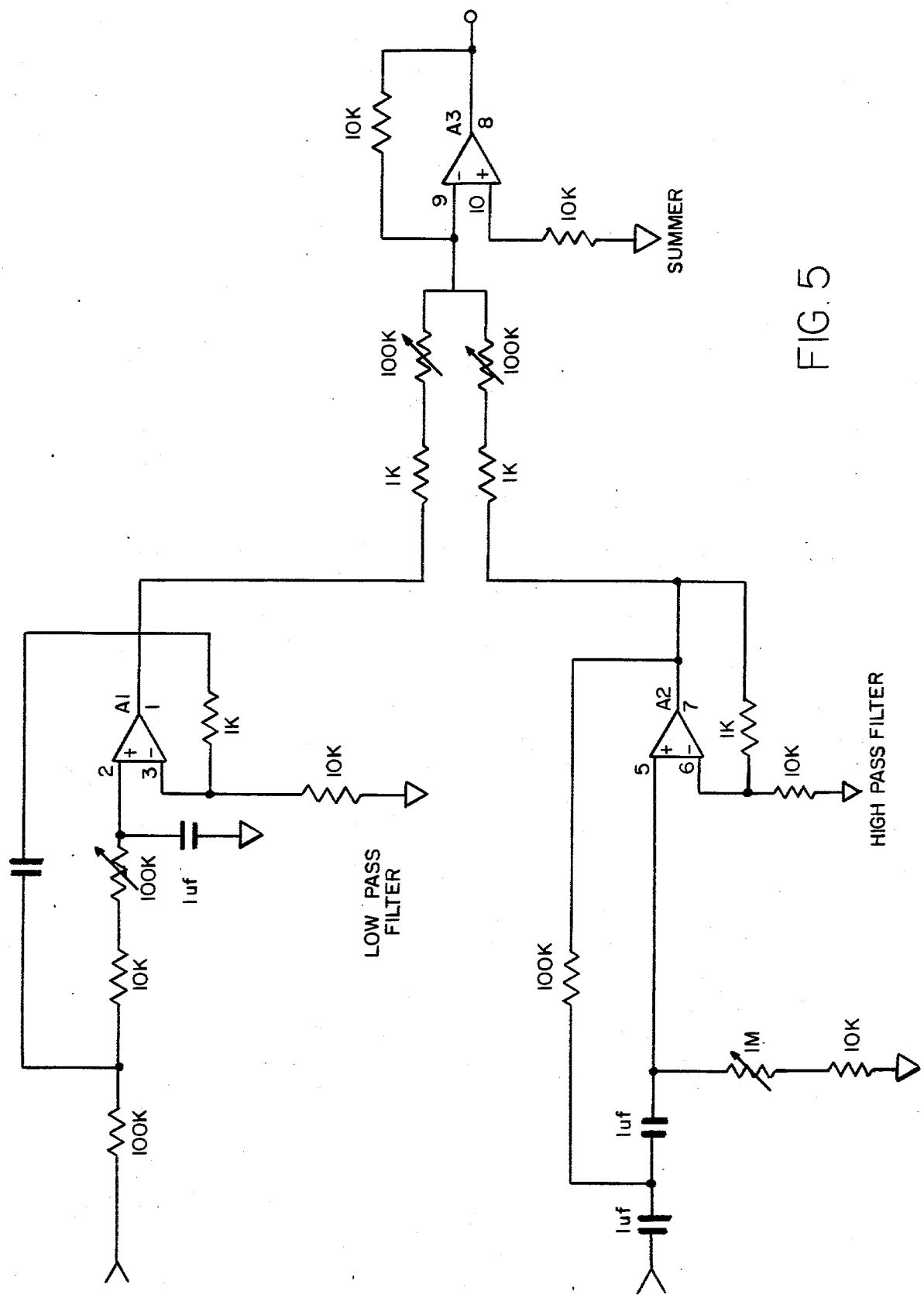

Referring now to FIG. 5 there is shown a schematic diagram of the complementary low pass and high pass filters which provide the means by which the tracker error signal is integrated into the existing control loops of a telescope tracking system. Complementary filters, as defined within the context of this application, are two or more filters whose transfer functions, when summed, equal unity across the entire frequency range of interest. The major problems which are encountered in achieving true complementary filters are: balancing the relative gain for the individual filters to achieve unity gain for the sum; setting the cut-off frequencies for each filter to minimize notches and ripples in the overall transfer function; and trying to minimize the loss of phase at each interface between filters.

As described earlier, the complementary filter units which are utilized in the present invention comprise a single high pass filter and a low pass filter, the outputs of each filter being applied to and summed in a summer unit. As described earlier with respect to the discussion of FIG. 1, the input signal to the low pass filter, unit A1 is the output signal from the sample and hold circuit unit U23 (the example of FIGS. 4a–4d) of the tracker unit. The input signal to the high pass filter unit A2 is from the dynamic quad which was shown and described with respect to FIG. 1.

The low pass filter unit A2 is adjusted for a cut-off frequency of 2 Hz, with a roll-off rate of 40 dB/dec. This essentially limits the output signal of the low pass filter unit A1 to only d.c. components. The high pass filter unit A2 will also have a cut-off frequency of 2 Hz, with a roll-off rate of 40 dB/dec. By having both the low pass and the high pass filters identically ordered, the tuning and balancing of their output sum to achieve a unity transfer function over all frequencies is much easier to accomplish.

The output signals from the low pass and high pass filter units A1, A2 are applied to a summer/gain unit A3. The summer/gain unit A3 is utilized to balance out any gains which may be present in either of the filter units or in the tracker electronic circuit. Since the output signal from the summer/gain unit A3 must be an accurate reconstruction of the signal measurement by dynamic quad, these gain adjustments allow the signal from the tracker electronics via the low pass filter unit A1, and the signal from the dynamic quad via the high pass filter unit A1, to be adjusted to a level such that the compensator (which is the next element in the telescope tracker control loop) sees the same signal that it would have if it received its signal directly from the dynamic quad. The presence of a complementary filter pair within the tracker electronics allows the low frequency tracking to be incorporated into the existing control loops with no significant loss of bandwidth and with improved temporal stability.

Although the invention has been described with reference to a particular embodiment, it will be understood to those skilled in the art that the invention is capable of a variety of alternative embodiments within the spirit and scope of the appended claims.

What is claimed is:

1. A synthetic aperture multi-telescope tracker apparatus comprising in combination:

a plurality of telescopes each providing an output signal, a beam splitter in optical alignment with each of said plurality of telescopes to receive an output signal therefrom, said beam splitter providing a plurality of output signals which correspond respectively to the received output signal from each of said plurality of telescopes, a plurality of photo-detector units to respectively receive one output signal of said plurality of output signals from said beam splitter, each photo-detector unit of said plurality of photo-detector units respectively providing an x error and a y error signal corresponding to the tilt error of said plurality of telescopes, a chopper unit in optical alignment with said beam splitter to receive each output signal from said plurality of telescopes, said chopper unit generating a timing pulse, said chopper unit sequentially sampling each output signal to provide a plurality of sampled telescope return signals, a photo-detector means to receive each signal of said plurality of sampled telescope return signals and provide a plurality of x-y error signals corresponding thereto, a timing generator to receive said timing pulses from said chopper unit, said timing generator providing timing signals corresponding to said timing pulses, a plurality of integrator/low pass filter units to respectively receive said x error and y error signals from said plurality of photo-detector units, each of said plurality of integrator/low pass filter units integrating its error signal over a predetermined interval and filtering its error signal to provide the D.C. component of the telescope tilt error, a plurality of sample and hold units connected respectively to said plurality of integrator/low pass filter units to receive therefrom the D.C. component of the telescope tilt error, said plurality of sample and hold units sampling and holding said D.C. component of the telescope tilt error to provide a D.C. tilt error signal, a plurality of complementary low pass filter units to respectively receive said D.C. tilt error signal from said plurality of sample and hold units, a plurality of complementary high pass filter units to respectively receive said x error and y error signal from said plurality of photo-detector units, said plurality of complementary high pass filter units respectively filtering said x error and y error signal to provide the A.C. component of the telescope tilt error, each of said plurality of complementary high pass filter units respectively providing an A.C. tilt error signal, said plurality of complementary high pass filter units are respectively matched to said plurality of complementary low pass filter units so that they selectively pass a portion of the frequency spectrum but are matched so that the transfer function of their sum is unity at all frequencies, and, a plurality of summing units respectively connected to said plurality of complementary high pass filter units and said plurality of complementary low pass filter units such that the output signals of the corresponding filter units in x error signals and y error signals are combined to provide a tilt error signal in x and y for each of said plurality of telescopes.

2. A synthetic aperture multi-telescope tracker apparatus as described in claim 1 wherein said chopper unit comprises a chopper wheel with a plurality timing holes arranged at the outermost edge of said chopper wheel, a plurality of sampling holes are arranged along the edge of said chopper wheel to provide sampled telescope return signals, and a photodetector unit operating in conjunction with said plurality of timing holes to generate timing signals.

3. A synthetic aperture multi-telescope tracker apparatus as described in claim 1 wherein said plurality of photo-detector units comprises a single photo-detector cell to sample all of the telescope output beams to provide a single common reference point therefor.

4. A synthetic aperture multi-telescope tracker apparatus as described in claim 1 wherein said plurality of telescopes comprise three telescope units.

5. A synthetic aperture multi-telescope tracker apparatus as described in claim 1 wherein said plurality of integrator/low pass filter units are equally divided to respectively receive the same number of x and y error signals.

6. A synthetic aperture multi-telescope tracker apparatus as described in claim 1 wherein said plurality of complementary low pass filter units is respectively matched with a unit of said plurality of high pass filter units to form a matched set complementary low pass-high pass filter unit combination.

* * * * *